United States Patent

Sawahata

Patent Number: 5,933,359
Date of Patent: Aug. 3, 1999

[54] METHOD, APPARATUS AND COMPUTER PROGRAM PRODUCT FOR SIMULATING ION IMPLANTATION

[75] Inventor: Koichi Sawahata, Tokyo, Japan

[73] Assignee: NEC Corporation, Tokyo, Japan

[21] Appl. No.: 09/048,570

[22] Filed: Mar. 26, 1998

[30] Foreign Application Priority Data

Mar. 27, 1997 [JP] Japan .................................. 9-075284

[51] Int. Cl.$^6$ ................................................. G06F 19/00
[52] U.S. Cl. ........................ 364/578; 364/488; 364/489; 364/490; 364/491
[58] Field of Search ........................... 395/500; 364/578, 364/488, 489, 490, 491

[56] References Cited

U.S. PATENT DOCUMENTS 5,737,250   4/1998   Sawahata ................................ 364/578
5,784,302   7/1998   Kumashiro ............................. 364/578

OTHER PUBLICATIONS

Ryssel, H. et al., "Models for Implantation into Multilayer Targets", *Appl. Phys. A 41*, 201–207 (1986).
Fuse, G., et al., "Depth Profiles of Boron Atoms with Large Tilt–Angle Implantations", *Solid–State Science and Technology*, J. Electrochem. Soc., May 1986, pp. 996–998.
Koike, Hideteru et al., "Simulator for Semiconductor Device Design", Fuji Sogo Research, pp. 114–115.
"Analysis and Simulation of Semiconductor Devices", Springer–Verlag Vien New York, pp. 52–59.

Primary Examiner—Kevin J. Teska
Assistant Examiner—A. S. Roberts
Attorney, Agent, or Firm—Foley, Hoag & Eliot LLP

[57] ABSTRACT

An ion-implantation simulation method including (1) a step of generating orthogonal meshes for a multilayer-structure substrate, (2) a step of taking out a longitudinal strip, (3) a step of determining a function representing an impurity distribution in the longitudinal strip, (4) a step of integrating the function representing the impurity distribution in the range of each cell in the longitudinal strip, and dividing the integration value by the integration range to set the division result as the impurity concentration in the cell, (5) a step of taking out a transverse strip, (6) a step of determining a function of re-distributing the impurity distribution in the transverse strip in the transverse direction, and (7) a step of integrating the re-distributing function in the range of each cell in the transverse direction, dividing the integration result by the integration range and setting the division result as the impurity concentration in the cell.

18 Claims, 6 Drawing Sheets

| $y$ | $\int_a^y I_1(y)dy$ |
|---|---|
| . | . |
| . | . |
| . | . |
| . | . |
| $y_r$ | $\int_a^{y_r} I_1(y)dy$ |
| . | . |
| . | . |
| . | . |
| . | . |

FIG. 4B

| $x$ | $\int_b^x erfc(x)dx$ |
|---|---|
| . | . |
| . | . |
| . | . |
| . | . |
| $x_m$ | $\int_b^{x_m} erfc(x)dx$ |
| . | . |
| . | . |
| . | . |
| . | . |

METHOD, APPARATUS AND COMPUTER PROGRAM PRODUCT FOR SIMULATING ION IMPLANTATION

BACKGROUND OF THE INVENTION

1. Field of the Invention

The present invention relates to a method for simulating the distribution of impurities that has been implanted in a semiconductor device manufacturing process and particularly, to an ion-implantation simulating method in which dose is conserved.

2. Description of the Prior Art

In a semiconductor manufacturing field, a method for simulating the distribution of impurities with a process simulator has been used to estimate the characteristics and operation of devices in place of experimental or tentative measurements of the characteristics of devices. A method for simulating a two-dimensional profile of implanted ions using analytic equations is explained in "Depth Profiles of Boron Atoms with Large Tilt-Angle Implantations", J. Electrochem. Soc.: SOLID-STATE SCIENCE AND TECHNOLOGY, pp. 996–998 (1986). According to this publication, an distribution of implanted ions $C_{2d}(x,y)$ for the two-dimensional shape is expressed by the following equation (1):

$$C_{2d}(x, y) = \sum C_i(y) \frac{1}{2} \left\{ \text{erfc}\left(\frac{x - x_i}{\sqrt{2}\sigma_l}\right) - \text{erfc}\left(\frac{x - x_{i+1}}{\sqrt{2}\sigma_l}\right) \right\} \quad (1)$$

Here, $C_i(y)$ represents a distribution of implanted ions in one-dimensional structure which is calculated for an i-th layer, $\sigma_l$ represents a standard deviation of a re-distribution in the transverse direction for calculating a two-dimensional distribution of implanted ions based on a one-dimensional distribution of implanted ions, and erfc represents a complementary error function.

A method of calculating a one-dimensional impurity distribution $C_i(y)$ is explained in "Analysis and Simulation of Semiconductor Devices", Springer-Verlag Vien New York) as follows.

The distribution of implanted ions in one-dimensional single layer structure can be expressed by three kinds of analytic equations, i.e., the equation of a Gaussian distribution, the equation of joined Gaussian distribution and the equation of a Pearson distribution, which use parameters, Rp, $\sigma$, $\gamma$, $\beta$, called moments and characterizing the distribution of impurities after ion-implantation. Rp represents a range which indicates the average depth of the impurity distribution after the ion-implantation, $\sigma$ represents a deviation which indicates the breadth of the impurity distribution after the ion-implantation, $\lambda$ represents a skewness which indicates the distortion of the distribution, and $\beta$ represents a kurtosis indicating the sharpness of the distribution, and these parameters are extracted from profiles or the like which were actually measured in advance. These moments are determined in accordance with the combination of implantation energy, dose, substrate material, ion type, etc.

Here, for example, the Pearson distribution will be explained as follows. A function I(y) representing the Pearson distribution is given by the following equations using Rp, $\sigma$, $\gamma$, $\beta$:

$$dI(y')/dy' = (y' - a)I(y')/(b_0 + ay' + b_2 y'^2) \quad (2)$$

$$y' = y - Rp \quad (3)$$

$$a = -\sigma\gamma(\beta + 3)/A \quad (4)$$

$$b_0 = -\sigma^2\gamma(4\beta - 3\gamma^2)/A \quad (5)$$

$$b_2 = (-2\beta + 3\gamma^2 + 6)/A \quad (6)$$

$$A = 10\beta - 12\gamma^2 - 18 \quad (7)$$

Function I(y) is normalized so that the integral value thereof is equal to 1, and the dose specified at the time of the ion-implantation is multiplied to function I(y) to calculate the distribution after the ion-implantation.

In place of the above three kinds of equations, a dual Pearson distribution obtained by summing up two independent Pearson distributions may be used.

A method for simulating the distribution implanted ions in one-dimensional multilayer structure can be obtained by expanding the method for distribution implanted ions in one-dimensional two-layer structure which is described in "Models for Implantation into Multilayer Targets", Appl. Phys. A41, pp.201–207 (1986) (by H. Ryssel, J. Lorens, and K. Hoffmann). The material is defined for each layer of the substrate, and the moment for each material is given in advance. Therefore, the impurity distribution I(y) which is normalized so that the dose is equal to one can be calculated for each layer. In order to simulate the distribution of implanted ions in the multilayer structure, the uppermost layer is set as a first layer, the normalized impurity distribution for a k-th layer is defined by equation (8) and the actual impurity distribution is defined by equation (9):

$$I_k\left(y - \sum_{i=1}^{k-1} t_i + \sum_{i=1}^{k-1} \frac{t_i R_{pk}}{R_{pi}}\right) \quad (8)$$

$$D_k I_k\left(y - \sum_{i=1}^{k-1} t_i + \sum_{i=1}^{k-1} \frac{t_i R_{pk}}{R_{pi}}\right), \quad (9)$$

where $t_i$ represents the thickness of i-th layer, and $R_{pi}$ represents the range in i-th layer. $R_{pk}$ represents the range in the layer for which the distributions are calculated (i.e., the k-th layer). $D_k$ represents the dose of k-th layer, and is obtained by subtracting from the total dose a partial dose which has been consumed until reaching the (k-1)-th layer.

Figure 6:
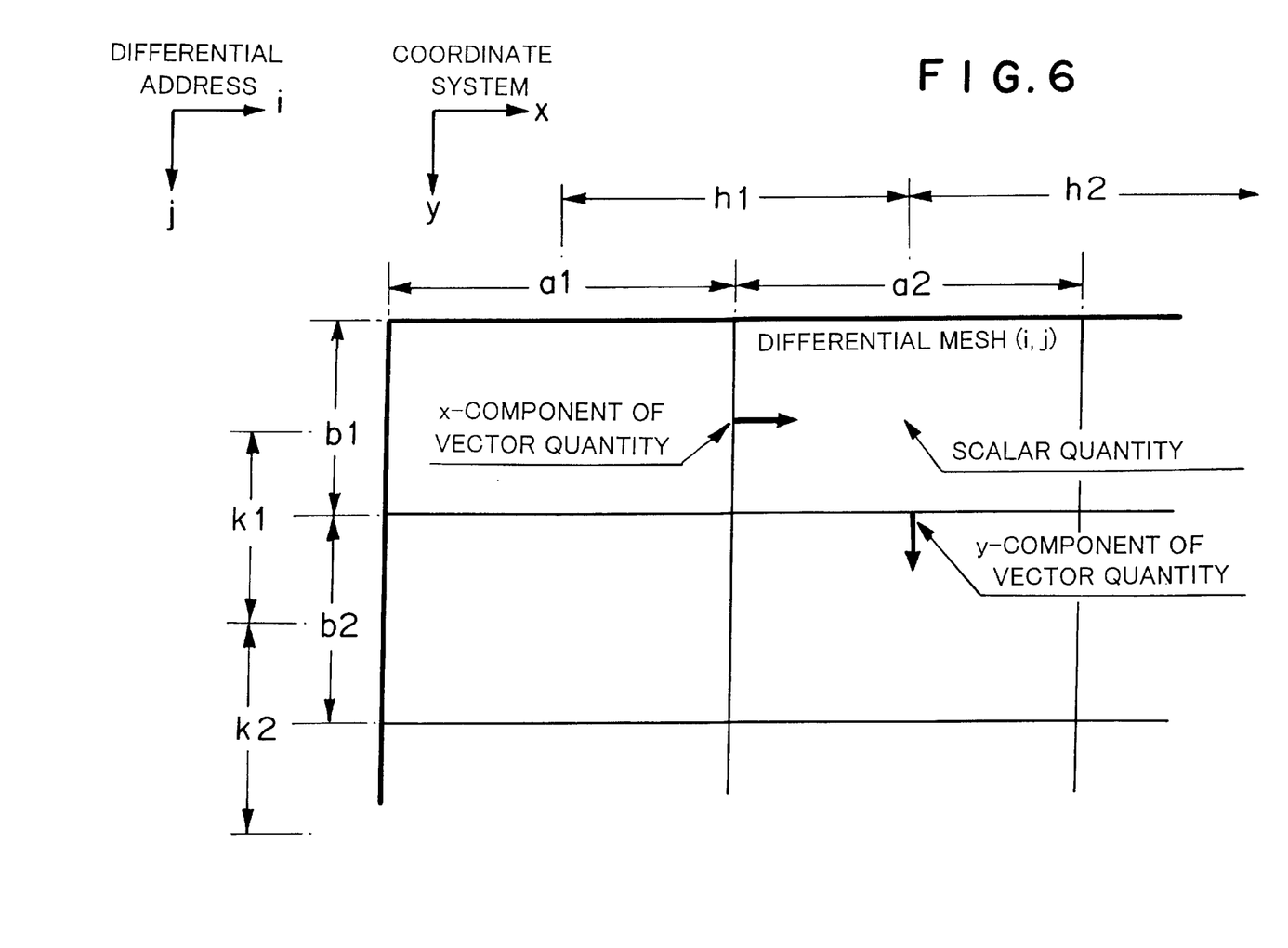
FIG. 6 is a diagram showing meshes used for simulation.

The impurity distribution which has been calculated on the basis of analytic equation (1) is then passed to a simulator for oxidation, diffusion, etc. According to "Simulator for Semiconductor Device Design" written by Hideteru Koike, et al. and edited by Fuji Sogo Research, pp114–115, the impurity distribution which is handled by the simulator for oxidation, diffusion, etc. is required to be defined on a differential mesh shown in FIG. 6. In FIG. 6, ai represents the width of the differential mesh along x direction, bi represents the width of the differential mesh along y direction, hi represents the distance between the center points of the adjoining meshes along x direction, and ki represents the distance between the center points of the adjoining meshes. One differential mesh is referred to as "control volume".

Figure 5:
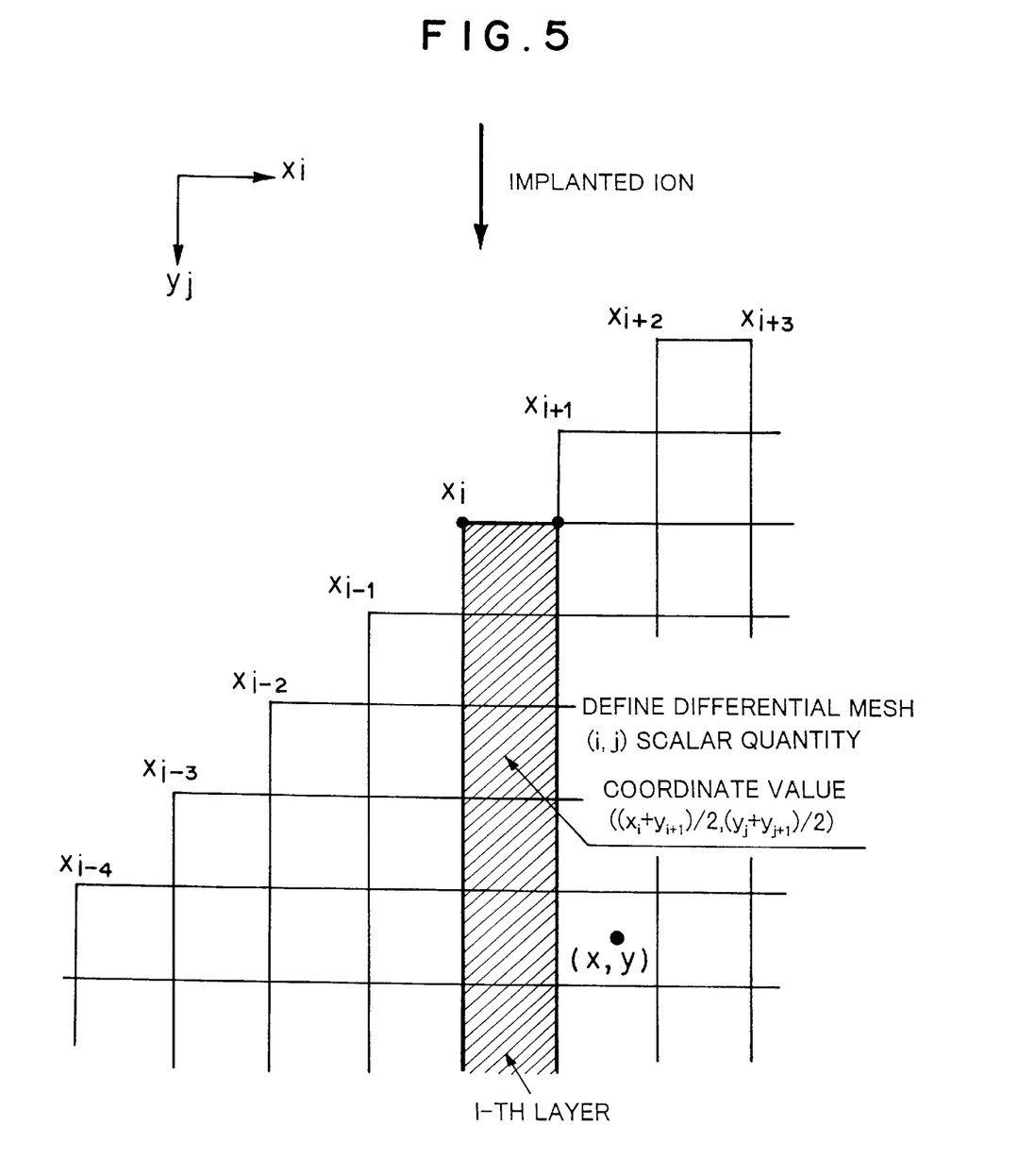
FIG. 5 is a diagram showing a conventional method for calculating a distribution of implanted ions.

The impurity concentration which is scalar quantity is defined, for example, at the center point of the different mesh. Therefore, an impurity distribution $C_{2d}((x_i+x_{i+1})/2, (y_j+y_{j+1})/2)$ at the coordinate $((x_i+x_{i+1})/2, (y_j+y_{j+1})/2)$ at which the scalar quantity of FIG. 5 is defined is calculated from equation (1), and is defined on $((x_i+x_{i+1})/2, (y_j+y_{j+1})/2)$ of FIG. 5.

In the above-described conventional technique, the impurity concentration on a cell (control volume) which is cut out by the meshes is represented by the impurity concentration at the center point of the cell which is given by the equation (1). However, the concentration of the center point does not accurately reflect the impurity concentration of the overall cell. Therefore, even when the impurity concentration is integrated over all the areas by using the impurity concentrations determined as described above to calculate the dose, the dose thus calculated is not equal to the preset dose. Accordingly, it was impossible to accurately estimate the characteristics of a device even when the characteristics of the device is estimated on the basis of the impurity concentration thus determined.

SUMMARY OF THE INVENTION

Accordingly, an object of the present invention is to enable the impurity concentration of each cell to reflect the dose more accurately, whereby the characteristics of a device to be formed can be estimated more accurately.

The above problem can be solved by integrating a function giving an impurity concentration between meshes, and setting a value which is obtained by dividing the integration value by an integration range as the impurity concentration of a cell.

Figures 1A, 1B:
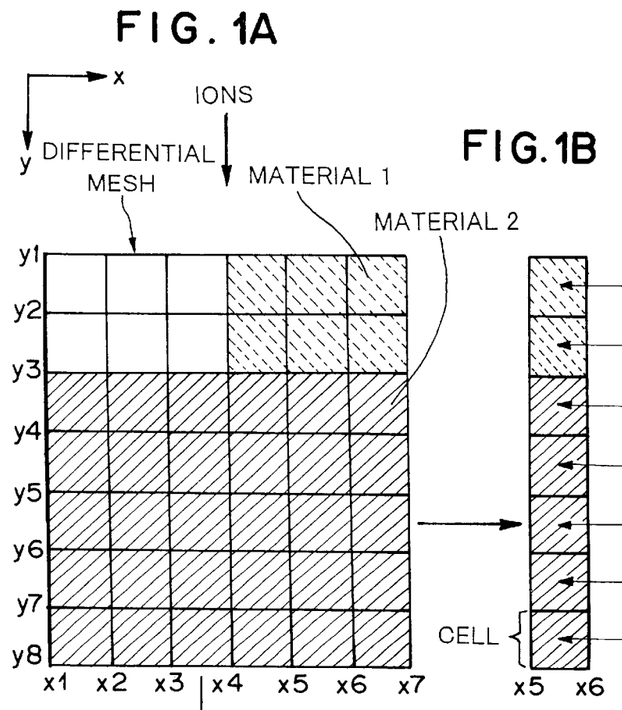
FIGS. 1A through 1E are diagrams showing a case in which an ion-implantation simulation is performed for a two-dimensional substrate for the explanation of first and second embodiments of the present invention.
Figure 1C:
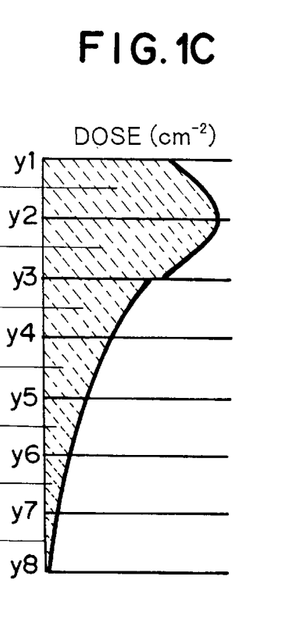
Figure 1D:
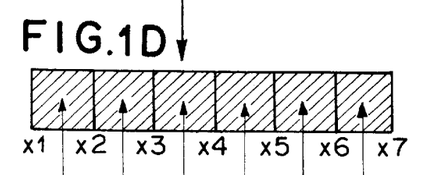
Figure 1E:
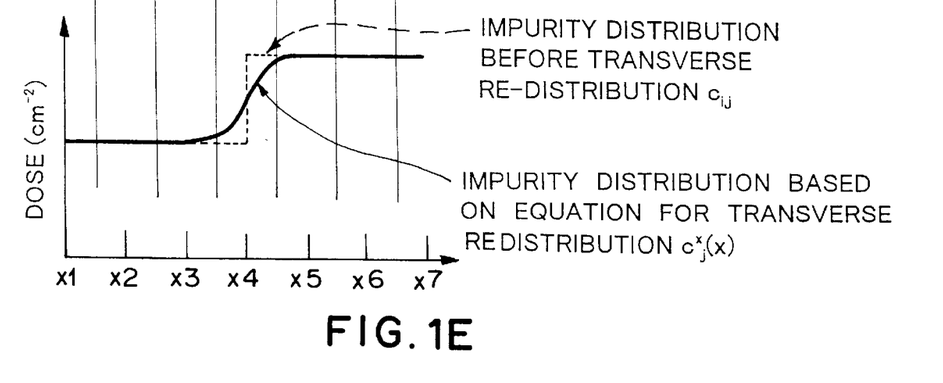

According to the present invention, there is provided a method for simulating ion-implantation which comprises steps of: (1) generating orthogonal meshes for a multilayer-structured substrate having any shape (FIG. 1A); (2) taking out: a longitudinal strip which is partitioned out by transverse meshes among said orthogonal meshes (FIG. 1B); (3) determining a function representing the impurity distribution in said longitudinal strip (FIG. 1C); (4) integrating said function representing the impurity distribution in the longitudinal strip in the range of each cell in said longitudinal strip, and dividing the integration value by the integration range to set the division result as the impurity concentration in said cell (FIGS. 1B and 1C); (5) taking out a transverse strip which is partitioned out by longitudinal meshes among said orthogonal meshes (FIG. 1D); (6) determining a function for re-distributing the impurity distribution in said transverse strip in transverse direction (FIG. 1E); and (7) integrating said function for re-distribution in the range of each cell in transverse direction, and dividing the integration result by the integration range and setting the division result as the impurity concentration in said cell (FIGS. 1D and 1E).

Therefore, the dose at the beginning of distribution of impurities is conserved even after the end of distribution under the simulation. That is, the simulation result reflects the dose, thus the characteristics of the device can be estimated more accurately.

DETAILED DESCRIPTION OF THE PREFERRED EMBODIMENT

A preferred embodiment according to the present invention will be described hereunder with reference to the accompanying drawings.

First Embodiment

Figure 2:
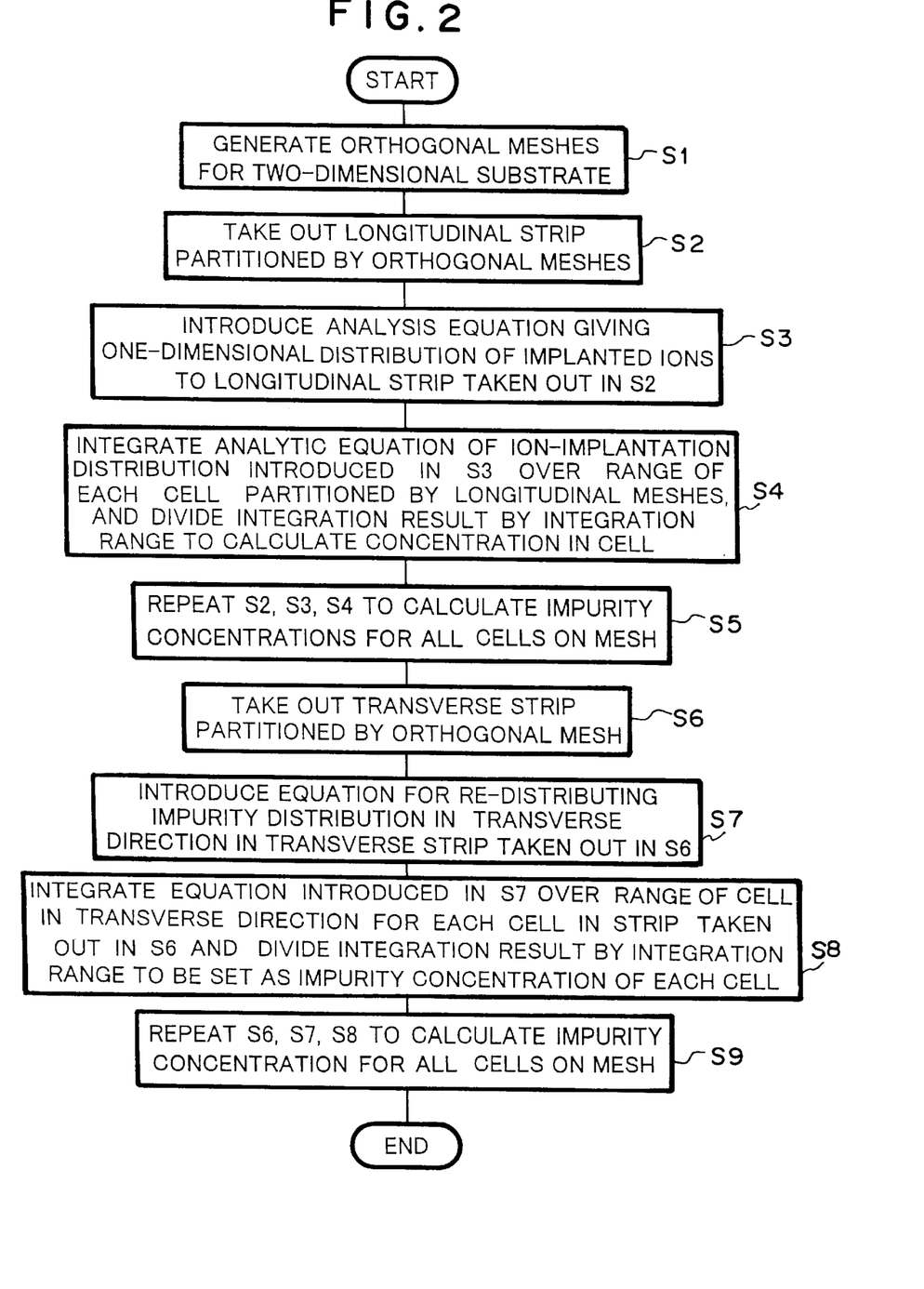
FIG. 2 is a flowchart showing a process according to the first embodiment of the present invention.

FIGS. 1A through 1E are diagrams for explaining the first embodiment of the present invention, and FIG. 2 is a flowchart showing a process of the first embodiment. First, in step S1, orthogonal meshes are generated for a two-dimensional substrate shown in FIG. 1A. Subsequently, in step S2, a strip in the longitudinal direction (a longitudinal strip) which has been partitioned out by transverse meshes $x_i$, $x_{i+1}$ among orthogonal meshes generated in step S1 is taken out (FIG. 1B).

Subsequently, in step S3, an analytic equation $c^y_i(y)$ which gives a distribution of implanted ions for a one-dimensional multilayer structure is applied for the longitudinal strip which is taken out in step S2. In the case of FIG. 1B, when the moments for material 1 are represented by $R_{p1}$, $\sigma 1$, $\gamma 1$, $\beta 1$, the moments for material 2 are represented by $R_{p2}$, $\sigma 2$, $\gamma 2$, $\beta 2$, and $I_1(y)$ represents the analytic equation which is given by a Pearson distribution (the equations (2) to (7)) or the like using the moments for the material 1 while $I_2(y)$ represents the analytic equation which is given by a Pearson distribution, a dual Pearson distribution, or the like using the moments for the material 2, analytic equation $c^y_i(y)$ is given by the following equation (10):

$$c^y_i = D_1 I_1(y) \qquad (y_1 \leq y < y_3) \qquad (10)$$
$$D_2 I_2(y - t_1 + t_1 R_{p2}/R_{p1}) \quad (y_3 \leq y < y_8),$$

where $t_1$ represents the thickness $y_3 - y_1$ of the material 1.

Subsequently, in step S4, the analytic equation (10) shown in FIG. 1C which gives the impurity distribution and is introduced in step S3 is subjected to definite integral in the range in the longitudinal direction of one cell which is partitioned out by the longitudinal mesh $y_j$, $y_{j+1}$ as shown in FIG. 1B, and the value which is obtained by dividing the integral value by the integration range is set as the impurity concentration of the cell concerned. The calculation of the integration is performed on the basis of the numerical integration such as Gaussian integration or the like. In FIG. 1B, the impurity concentration $c_{i,j}$ which is registered to a cell partitioned out by the longitudinal meshes $y_j$, $y_{j+1}$ is given by the equation (11):

$$c_{i,j} = \frac{\int_{y_j}^{y_{j+1}} c^y_i(y) dy}{y_{j+1} - y_j}. \qquad (11)$$

Subsequently, in step S5, steps S2, S3 and S4 are repeated to calculate the impurity concentration $c_{i,j}$ for all the cells on the mesh.

Next, in step S6, the transverse strip which is partitioned out by the longitudinal meshes $y_j$, $y_{j+1}$ is taken out as shown in FIG. 1D. Subsequently, in step S7, a formula $c^x_j(x)$ for re-distributing the impurities is introduced for all the cells of the transverse strip which was taken out in step S6 as shown in FIG. 1E. In FIG. 1D, the formula $c^x_j(x)$ for re-distributing the impurities in the cell between $x_i$ and $x_{i+1}$ is given by equation (12) on the basis of equation (1):

$$c_j^x(x) = \sum_{i'=1}^{n-1} c_{i',j} \frac{1}{2} \left\{ \text{erf}\left(\frac{x - x_{i'}}{\sqrt{2}\sigma_l}\right) - \text{erf}\left(\frac{x - x_{i'+1}}{\sqrt{2}\sigma_l}\right) \right\}, \quad (12)$$

where i is substituted by i', and n represents the maximum value of i (or i').

Subsequently, in step S8, the formula of the transverse re-distribution which was introduced in step S7 is subjected to definite integral in the range of each cell in the transverse direction, and the integral value is divided by the integration range to calculate the concentration $C_{i,j}$ after the transverse re-distribution for each cell. $C_{i,j}$ is given by equation (13):

$$C_{i,j} = \frac{1}{x_{i+1} - x_i} \int_{x_i}^{x_{i+1}} c_j^x(x) dx. \quad (13)$$

By substituting equation (12) for $c_j^x(x)$ in equation (13), $C_{i,j}$ is given by equation (14):

$$C_{i,j} = \frac{1}{2(x_{i+1} - x_i)} \sum_{i'=1}^{n-1} c_{i',j} \left\{ \int_{xi}^{x_{i+1}} \text{erf}\left(\frac{x - x_{i'}}{\sqrt{2}\sigma_l}\right) dx - \int_{x_i}^{x_{i+1}} \text{erf}\left(\frac{x - x_{i'+1}}{\sqrt{2}\sigma_l}\right) dx \right\}. \quad (14)$$

Here, the actual integration calculation is performed on the basis of the numerical integration such as Gaussian integration or the like.

Subsequently, in step S9, the processing of steps S6, S7 and S8 is repetitively performed to calculate the impurity concentration for all the cells on the mesh.

Second Embodiment

Next, a second embodiment of the present invention will be explained hereunder.

Figure 3:
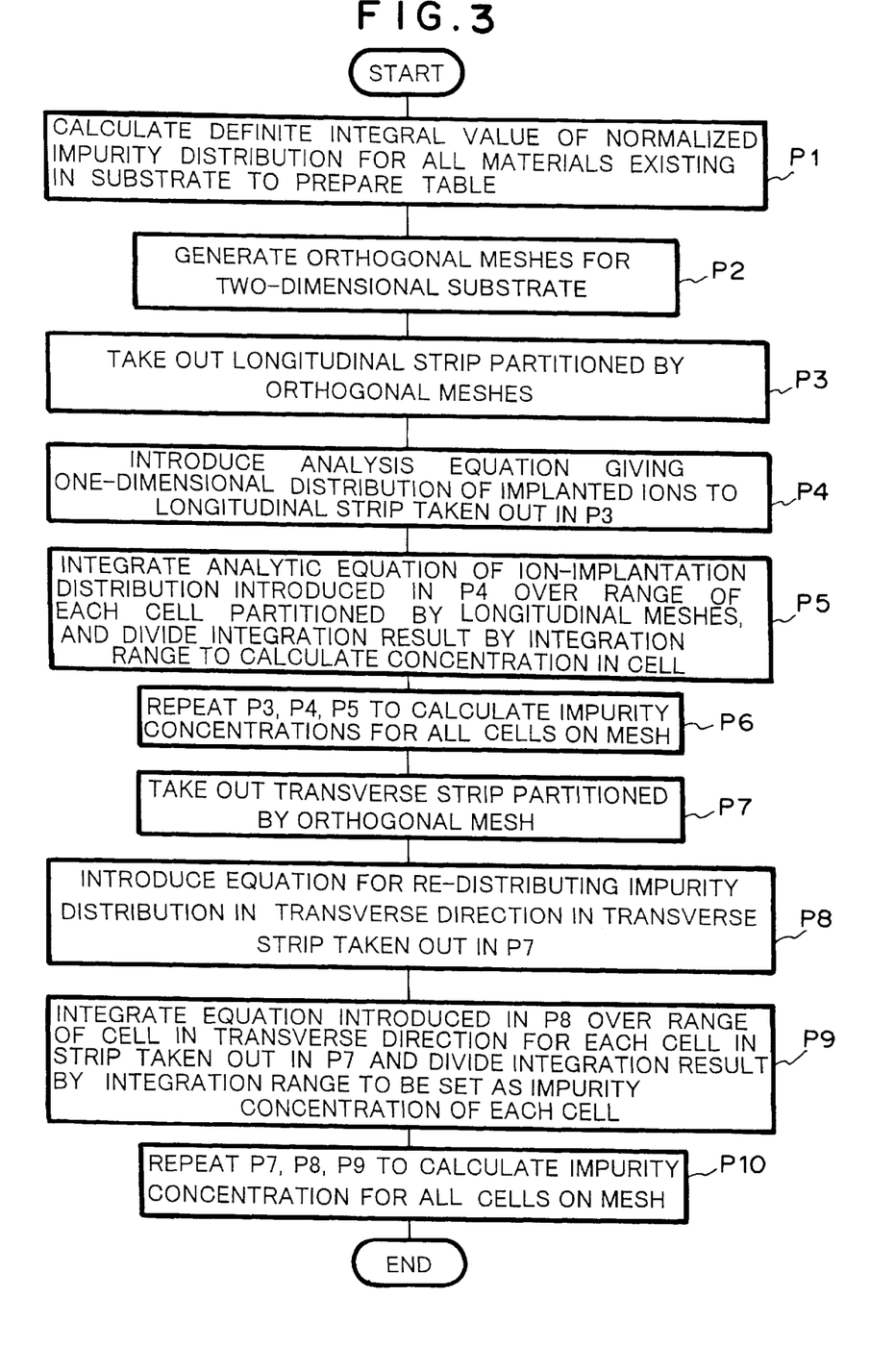
FIG. 3 is a flowchart showing a process according to the second embodiment of the present invention.
Figure 4A:
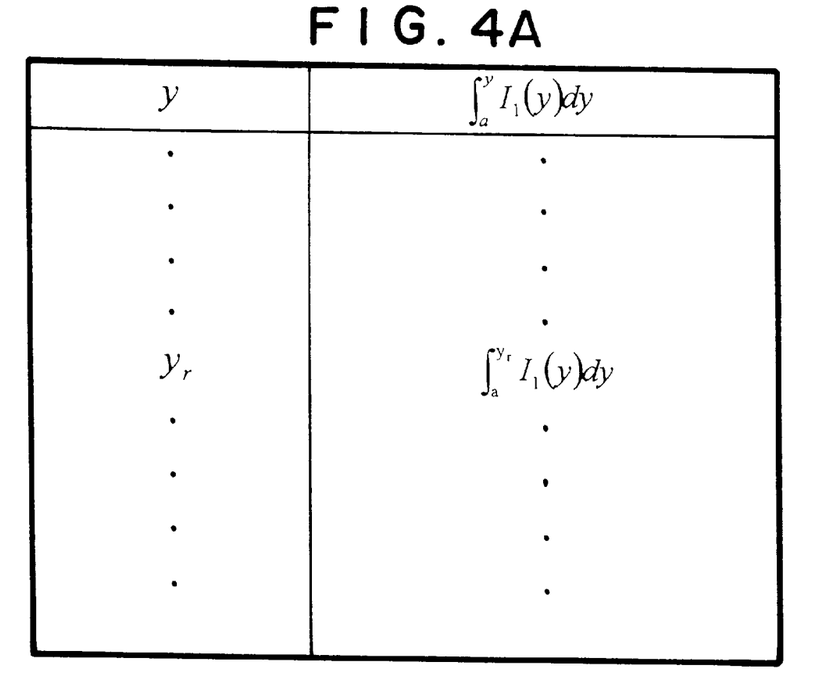
FIG. 4A is a diagram showing a table of the definite integral value of impurity distribution normalized for substance 1 according to the second embodiment of the present invention.

FIG. 3 is a flowchart showing the process according to the second embodiment of the present invention. FIG. 1 which was used for the explanation of the first embodiment is used for the explanation of the second embodiment. First, in step P1, the normalized functions of the impurity distributions for all the materials constituting the substrate are determined, and each of the functions is subjected to definite integral to prepare a table for each of all the functions. Each of the normalized impurity distributions for the substrate can be represented by a Pearson distribution, a dual Pearson distribution, or the like which uses moments defined for each material. Here, when the normalized impurity distribution for material 1 of FIG. 1A is represented by $I_1(y)$ as in the case of the first embodiment, the definite integral values for the material 1 are tabled as shown in FIG. 4A. In the integration in FIG. 4A, r represents an integer, and a represents any real number. A numerical sequence y1, y2, y3, ... is a regular numeral sequence such as a arithmetic sequence or the like. Further, actual calculation of the integration of equation (15) shown in the table is performed by numerical integration such as Gaussian integration or the like. Further, when the substrate shown in FIG. 1A is used, a similar table is prepared for material 2.

Figure 4B:
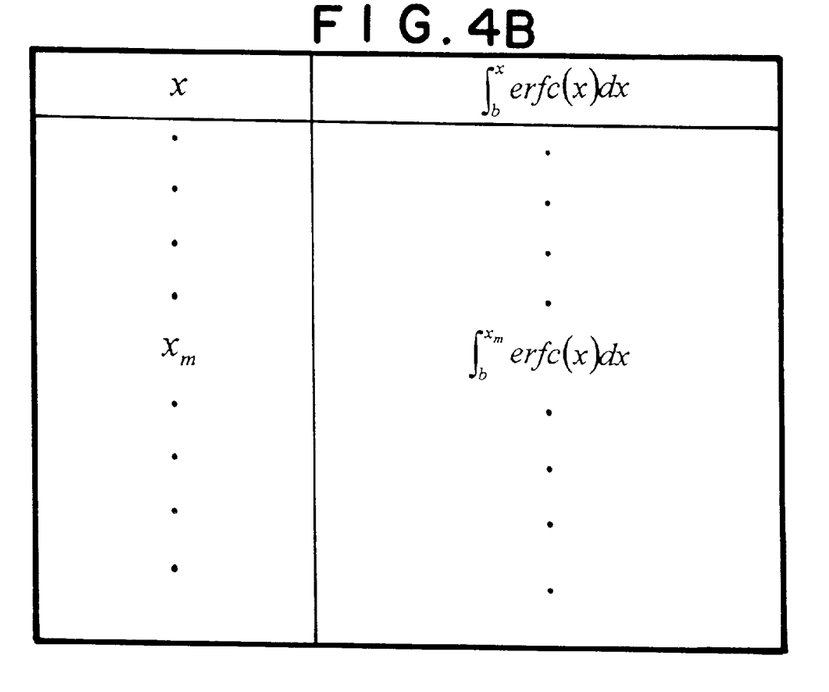
FIG. 4B is a diagram showing a table of the definite integral value of impurity distribution normalized for substance 2 according to the second embodiment of the present invention.

On the other hand, the table shown in FIG. 4B must be prepared before the flow of this embodiment starts.

$$\int_a^{y_r} I_1(y) dy \quad (15)$$

Subsequently, in step P2, orthogonal meshes are generated for the two-dimensional substrate shown in FIG. 1A as in the case of step S1 of the first embodiment. Thereafter, in step P3, a longitudinal strip which is partitioned out by transverse meshes $x_i$, $x_{i+1}$ among the orthogonal meshes generated in the step P2 is taken out as in the case of step S2 (FIG. 1B).

Subsequently, in step P4, an analytic equation $c_i^y(y)$ which gives a distribution of implanted ions for the one-dimensional multilayer structure is introduced for the longitudinal strip which was taken out in step P3 as in the case of step S3. The introduced equation for the strip shown in FIG. 1B is the same as equation (10) similar to the first embodiment.

Subsequently, in step P5, the analytic equation which gives the impurity distribution and is introduced in step P4 is integrated over the longitudinal range of one cell partitioned out by the longitudinal meshes as shown in FIG. 1B, and the integral value is divided by the integration range to set the division result as the impurity concentration of the cell concerned as in the case of the step S4. In FIG. 1B, the impurity concentration $c_{i,j}$ which is registered in the cell partitioned out by the longitudinal meshes $y_j$, $y_{j+1}$ is given by equation (11) as in the case of the first embodiment. The integration was performed by the numerical integration such as the Gaussian distribution or the like in the first embodiment. However, in this embodiment, the calculation is performed using the table of FIG. 4A which was prepared in step P1. At the beginning of the integration, the function $c_i^y(y)$ representing the impurity distribution in the cell between $y_j$ and $y_{j+1}$ is expressed by the normalized impurity distribution and the dose. If the cell between $y_j$ and $y_{j+1}$ exists in the k-th layer of the one-dimensional structure, $c_i^y(y)$ is given by equation (16) on the basis of equation (9):

$$c_i^y(y) = D_k I_k \left( y - \sum_{i=1}^{k-1} t_i + \sum_{i=1}^{k-i} \frac{t_i R_{pk}}{R_{pi}} \right). \quad (16)$$

Therefore, equation (11) is rewritten as shown in equation (17):

$$c_{i,j} = \frac{1}{y_{j+1} - y_j} D_k \int_{y_j}^{y_{j+1}} I_k \left( y - \sum_{i=1}^{k-1} t_i + \sum_{i=1}^{k-1} \frac{t_i R_{pk}}{R_{pi}} \right) dy. \quad (17)$$

The integration portion of equation (17) is rewritten as shown in equation (18):

$$\int_{y_j}^{y_{j+1}} I_k \left( y - \sum_{i=1}^{k-1} t_i + \sum_{i=1}^{k-1} \frac{t_i R_{pk}}{R_{pi}} \right) dy = \int_{y_j - \alpha}^{y_{j+1} - \alpha} I_k(y) dy \quad (18)$$

where $$\alpha = \sum_{i=1}^{k-1} t_i - \sum_{i=1}^{k-1} \frac{t_i R_{pk}}{R_{pi}}.$$

Further, equation (18) is rewritten as shown in equation (19):

$$\int_{y_j-\alpha}^{y_{j+1}-\alpha} I_k(y)dy = \int_a^{y_{j+1}-\alpha} I_k(y)dy - \int_a^{y_j-\alpha} I_k(y)dy. \quad (19)$$

The first and second terms of the right side of equation (19) are interpolated from the table of FIG. 4A and substituted into equations (18) through (19) to calculate the integration portion of equation (11) or (17), thereby calculating $c_{i,j}$. When the interpolation is performed, it is necessary to calculate r which satisfies the inequality: $y_r \leq y_{j+1}-\alpha < y_{r+1}$ or $y_r \leq y_j-\alpha < y_{r+1}$. Because $y_r$ is a regular numerical sequence such as an arithmetic sequence or the like, the value of r can be determined by one calculation, for example, by dividing $y_{j+1}-\alpha$ or $y_j-\alpha$ by the interval of the numerical sequence $y_r$.

Next, in step P6, the processing of steps P3, P4 and P5 is repetitively performed to calculate the impurity concentration $c_{i,j}$ for all the cells on the mesh.

Subsequently, in step P7, the transverse strip partitioned out by longitudinal meshes $y_j$, $y_{j+1}$ is taken out as in the case of step S6. Subsequently, in step P8, the equation $c^x(x)$ for re-distributing the impurities is introduced for all the cells in the transverse strip which is taken out in step P7 as in the case of step S7. In FIG. 1D, the equation $c^x_j(x)$ for re-distributing the impurities of the cell between $x_i$ and $x_{i+1}$ is set to equation (12) as in the case of the first embodiment. Subsequently, in step P9, the equation for re-distribution in the transverse direction which is introduced in step P8 is integrated over the range of each cell in the transverse direction and the integration value is divided by the integration range to determine an equation for calculating the concentration $C_{i,j}$ after the re-distribution in the transverse direction, whereby the concentration $C_{i,j}$ after the re-distribution in the transverse direction is determined from equation (14) as in the case of the first embodiment. In the first embodiment, the integration of equation (14) was performed by the numerical integration such as the Gaussian integration or the like. However, in this embodiment, the integration calculation is performed using the table shown in FIG. 4B which is prepared by calculating the definite integration of $\int \text{erfc}(x)dx$ from b to $x_m$ by the Gaussian integration or the like. Here, m represents an integer, and b represents any real number. Further, as in the case of the table for the distribution in the longitudinal direction, the numerical sequence $x_m$ has already been set to a regular numerical sequence. The integration portion of equation (14) is sequentially rewritten as shown in equations (20), (21), (22), and (23):

$$\int_{x_i}^{x_{i+1}} \text{erfc}\left(\frac{x-x_{i'}}{\sqrt{2}\sigma_l}\right)dx = \sqrt{2}\sigma_l \int_{\frac{x_i-x_{i'}}{\sqrt{2}\sigma_l}}^{\frac{x_{i+1}-x_{i'}}{\sqrt{2}\sigma_l}} \text{erfc}(x)dx \quad (20)$$

$$\int_{x_i}^{x_{i+1}} \text{erfc}\left(\frac{x-x_{i'+1}}{\sqrt{2}\sigma_l}\right)dx = \sqrt{2}\sigma_l \int_{\frac{x_i-x_{i'+1}}{\sqrt{2}\sigma_l}}^{\frac{x_{i+1}-x_{i'+1}}{\sqrt{2}\sigma_l}} \text{erfc}(d)dx \quad (21)$$

$$\sqrt{2}\sigma_l \int_{\frac{x_i-x_{i'}}{\sqrt{2}\sigma_l}}^{\frac{x_{i+1}-x_{i'}}{\sqrt{2}\sigma_l}} \text{erfc}(x)dx = \quad (22)$$

$$\sqrt{2}\sigma_l \int_b^{\frac{x_{i+1}-x_{i'}}{\sqrt{2}\sigma_l}} \text{erfc}(x)dx - \sqrt{2}\sigma_l \int_b^{\frac{x_i-x_{i'}}{\sqrt{2}\sigma_l}} \text{erfc}(x)dx$$

$$\sqrt{2}\sigma_l \int_{\frac{x_i-x_{i'+1}}{\sqrt{2}\sigma_l}}^{\frac{x_{i+1}-x_{i'+1}}{\sqrt{2}\sigma_l}} \text{erfc}(x)dx = \quad (23)$$

$$\sqrt{2}\sigma_l \int_b^{\frac{x_{i+1}-x_{i'+1}}{\sqrt{2}\sigma_l}} \text{erfc}(x)dx - \sqrt{2}\sigma_l \int_b^{\frac{x_i-x_{i'+1}}{\sqrt{2}\sigma_l}} \text{erfc}(x)dx.$$

The values of the definite integration of equations (22) and (23) are interpolated from table of FIG. 4B to calculate the impurity distribution $C_{i,j}$ after the re-distribution in the transverse direction.

Subsequently, in step P10, the processing of steps P7, P8 and P9 is repetitively performed to calculate the impurity concentration of all the cells on the mesh.

In the second embodiment, the integration to calculate the impurity concentration at each cell is not performed by the numerical integration, but is performed by the interpolation based on the tables. Therefore, the calculation time can be more shortened as compared with the first embodiment. For example, when the number of the two-dimensional meshes shown in FIG. 1A is 100 in both of the longitudinal and transverse directions, the number of the cells is equal to 10,000, and the integration must be carried out at 10,000 times in order to calculate only the distribution in the longitudinal direction. If the number of the integration times to prepare the table is reduced to about several hundreds, the number of the integration times which are needed in the second embodiment is reduced to about several tens to about one hundredths as compared to the first embodiment.

As explained above, according to the ion-implantation. simulation method of the present invention, the impurity distribution function which is calculated for the longitudinal strip is integrated over the range of each cell of the longitudinal strip, the integration result is divided by the integration range, and the division result is set as the impurity concentration of the cell. Thereafter, the function for the re-distribution in the transverse direction which is calculated on the basis of the impurity concentration thus calculated is integrated over the range of each cell in the transverse direction, the integration result is divided by the range of each cell in the transverse strip, and the division result is set as the impurity concentration of the cell, thereby determining the impurity distribution. Therefore, the dose at the beginning of distribution of impurities is conserved even after the end of distribution under the simulation. Accordingly, according to the present invention, the simulation result reflects the dose, thus the characteristics of semiconductor devices which will be manufactured using the ion-implantation can be estimated more accurately.

Preferably, the present invention is a computer program executing in a computer system which comprises a central processing unit, a main memory, a secondary memory, and a bus connecting the central processing unit, the main memory, and the secondary memory. The computer program is stored in the secondary memory. The computer program resides in a main memory during execution. The computer program includes instructions which causes the central processing unit to perform the functions or methods explained above.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A method for simulating ion-implantation which comprises steps of:
   1) generating orthogonal meshes for a multilayer-structured substrate having any shape;
   2) taking out a longitudinal strip which is partitioned out by transverse meshes among said orthogonal meshes;
   3) determining a function representing an impurity distribution in said longitudinal strip;
   4) integrating said function representing the impurity distribution in the longitudinal strip in an integration range of each cell in said longitudinal strip producing an integration value, and dividing the integration value by the integration range to provide a division result representing an impurity concentration in said cell;
   5) taking out a transverse strip which is partitioned out by longitudinal meshes among said orthogonal meshes;
   6) determining a function for re-distributing the impurity distribution in said transverse strip in transverse direction; and
   7) integrating said function for re-distribution in another integration range of each cell in transverse direction producing an integration result and dividing the integration result by the other integration range producing a division result representing an impurity concentration in said cell.

2. The method as set forth in claim 1, which further comprises a step of generating a table for said longitudinal strip which indicates the definite integral value at every predetermined pitch of said function representing the impurity distribution in the longitudinal strip before said step (1), wherein in said step (4) said impurity concentration in the cell is determined using said definite integral value in said table for the longitudinal strip.

3. The method as set forth in claim 2, wherein said function representing the impurity distribution in the longitudinal strip is a normalized function.

4. The method as set forth in claim 1, which further comprises a step of generating a table for said transverse strip which is used for calculation of the integration of said function for re-distributing the impurities distribution in the transverse strip in transverse direction before said step (1), wherein when said impurity concentration of each cell in the transverse strip is determined at said step 7, the calculation is performed by referring to said table for the transverse strip.

5. The method as set forth in claim 2, which further comprises a step of generating a table for said transverse strip which is used for calculation of the integration of said function for re-distributing the impurities distribution in the transverse strip in transverse direction before said step (1), wherein when said impurity concentration of each cell in the transverse strip is determined at said step 7, the calculation is performed by referring to said table for the transverse strip.

6. The method as set forth in claim 3, which further comprises a step of generating a table for said transverse strip which is used for calculation of the integration of said function for re-distributing the impurities distribution in the transverse strip in transverse direction before said step (1), wherein when said impurity concentration of each cell in the transverse strip is determined at said step 7, the calculation is performed by referring to said table for the transverse strip.

7. An apparatus for simulating ion-implantation which comprises:

1) means for generating orthogonal meshes for a multilayer-structured substrate having any shape;
   2) means for taking out a longitudinal strip which is partitioned out by transverse meshes among said orthogonal meshes;
   3) means for determining a function representing an impurity distribution in said longitudinal strip;
   4) means for integrating said function representing the impurity distribution in the longitudinal strip in an integration range of each cell in said longitudinal strip producing an integration value, and for dividing the integration value by the integration range to provide a division result representing an impurity concentration in said cell;
   5) means for taking out a transverse strip which is partitioned out by longitudinal meshes among said orthogonal meshes;
   6) means for determining a function for re-distributing the impurity distribution in said transverse strip in transverse direction; and
   7) means for integrating said function for re-distribution in another integration range of each cell in transverse direction producing an integration result, and for dividing the integration result by the other integration range producing a division result representing an impurity concentration in said cell.

8. The apparatus as set forth in claim 7, which further comprises means for generating a table for said longitudinal strip which indicates the definite integral value at every predetermined pitch of said function representing the impurity distribution in the longitudinal strip, wherein said means for integrating the function representing the impurity distribution determines said impurity concentration in the cell using said definite integral value in said table for the longitudinal strip.

9. The apparatus as set forth in claim 8, wherein said function representing the impurity distribution in the longitudinal strip is a normalized function.

10. The apparatus as set forth in claim 7, which further comprises means for generating a table for said transverse strip which is used for calculation of the integration of said function for re-distributing the impurities distribution in the transverse strip in transverse direction, wherein said means for integrating the function for re-distribution performs calculation by referring to said table for the transverse strip when determining said impurity concentration of each cell in the transverse strip.

11. The apparatus as set forth in claim 8, which further comprises means for generating a table for said transverse strip which is used for calculation of the integration of said function for re-distributing the impurities distribution in the transverse strip in transverse direction, wherein said means for integrating the function for re-distribution performs calculation by referring to said table for the transverse strip when determining said impurity concentration of each cell in the transverse strip.

12. The apparatus as set forth in claim 9, which further comprises means for generating a table for said transverse strip which is used for calculation of the integration of said function for re-distributing the impurities distribution in the transverse strip in transverse direction, wherein said means for integrating the function for re-distribution performs calculation by referring to said table for the transverse strip when determining said impurity concentration of each cell in the transverse strip.

13. A computer program product comprising a computer useable medium having computer program logic stored therein, said computer program logic comprising:

1) means for generating orthogonal meshes for a multilayer-structured substrate having any shape;
2) means for taking out a longitudinal strip which is partitioned out by transverse meshes among said orthogonal meshes;
3) means for determining a function representing an impurity distribution in said longitudinal strip;
4) means for integrating said function representing the impurity distribution in the longitudinal strip in an integration range of each cell in said longitudinal strip producing an integration value, and for dividing the integration value by the integration range to provide a division result representing an impurity concentration in said cell;
5) means for taking out a transverse strip which is partitioned out by longitudinal meshes among said orthogonal meshes;
6) means for determining a function for redistributing the impurity distribution in said transverse strip in transverse direction; and
7) means for integrating said function for re-distribution in another integration range of each cell in transverse direction producing an integration result, and for dividing the integration result by the other integration range producing a division result representing an impurity concentration in said cell.

14. The computer program product as set forth in claim 13, which further comprises means for generating a table for said longitudinal strip which indicates the definite integral value at every predetermined pitch of said function representing the impurity distribution in the longitudinal strip, wherein said means for integrating the function representing the impurity distribution determines said impurity concentration in the cell using said definite integral value in said table for the longitudinal strip.

15. The computer program product as set forth in claim 14, wherein said function representing the impurity distribution in the longitudinal strip is a normalized function.

16. The computer program product as set forth in claim 13, which further comprises means for generating a table for said transverse strip which is used for calculation of the integration of said function for re-distributing the impurities distribution in the transverse strip in transverse direction, wherein said means for integrating the function for re-distribution performs calculation by referring to said table for the transverse strip when determining said impurity concentration of each cell in the transverse strip.

17. The computer program product as set forth in claim 14, which further comprises means for generating a table for said transverse strip which is used for calculation of the integration of said function for re-distributing the impurities distribution in the transverse strip in transverse direction, wherein said means for integrating the function for re-distribution performs calculation by referring to said table for the transverse strip when determining said impurity concentration of each cell in the transverse strip.

18. The computer program product as set forth in claim 15, which further comprises means for generating a table for said transverse strip which is used for calculation of the integration of said function for re-distributing the impurities distribution in the transverse strip in transverse direction, wherein said means for integrating the function for re-distribution performs calculation by referring to said table for the transverse strip when determining said impurity concentration of each cell in the transverse strip.

* * * * *